United States Patent
Palle Venkata et al.

(10) Patent No.: US 12,382,347 B2
(45) Date of Patent: Aug. 5, 2025

(54) TECHNOLOGIES FOR SYNCHRONIZATION SIGNALING DURING HANDOVERS

(71) Applicant: Apple Inc., Cupertino, CA (US)

(72) Inventors: Naveen Kumar R. Palle Venkata, San Diego, CA (US); Sarma V. Vangala, Campbell, CA (US); Zhibin Wu, Los Altos, CA (US); Yuqin Chen, Beijing (CN); Haijing Hu, Los Gatos, CA (US); Dawei Zhang, Saratoga, CA (US); Fangli Xu, Beijing (CN)

(73) Assignee: Apple Inc., Cupertino, CA (US)

( * ) Notice: Subject to any disclaimer, the term of this patent is extended or adjusted under 35 U.S.C. 154(b) by 580 days.

(21) Appl. No.: 17/440,541

(22) PCT Filed: Aug. 13, 2020

(86) PCT No.: PCT/CN2020/108972
§ 371 (c)(1),
(2) Date: Sep. 17, 2021

(87) PCT Pub. No.: WO2022/032586
PCT Pub. Date: Feb. 17, 2022

(65) Prior Publication Data
US 2022/0303835 A1 Sep. 22, 2022

(51) Int. Cl.
H04W 36/00 (2009.01)
H04W 36/08 (2009.01)
H04W 36/32 (2009.01)

(52) U.S. Cl.
CPC ... *H04W 36/0009* (2018.08); *H04W 36/0064* (2023.05); *H04W 36/087* (2023.05); *H04W 36/322* (2023.05)

(58) Field of Classification Search
CPC .......... H04W 36/005; H04W 36/0009; H04W 36/32; H04W 36/08
See application file for complete search history.

(56) References Cited

U.S. PATENT DOCUMENTS

| 2013/0155959 A1* | 6/2013 | Ikeda ................... H04W 88/02 370/328 |
| 2017/0215121 A1* | 7/2017 | Condeixa ................ H04W 4/40 |
| 2017/0303168 A1 | 10/2017 | Koodli et al. |

(Continued)

FOREIGN PATENT DOCUMENTS

| CN | 101980567 | 2/2011 |
| CN | 110945905 A | 3/2020 |

(Continued)

OTHER PUBLICATIONS

3rd Generation Partnership Project; Technical Specification Group Radio Access Network; Solutions for NR to Support Non-Terrestrial Networks (NTN) (Release 16), 3GPP TR 38.821 V16.0.0, Technical Report, Dec. 2019, 140 pages.

(Continued)

*Primary Examiner* — Jamal Javaid
*Assistant Examiner* — Ryan C Kavleski
(74) *Attorney, Agent, or Firm* — Kilpatrick Townsend & Stockton LLP

(57) ABSTRACT

The present application relates to devices and components including apparatuses, systems, and methods to provide technologies for synchronization signaling during handovers.

20 Claims, 11 Drawing Sheets

(56) References Cited

U.S. PATENT DOCUMENTS

| | | | |
|---|---|---|---|
| 2019/0369201 A1* | 12/2019 | Akkarakaran | G01S 5/10 |
| 2020/0153500 A1* | 5/2020 | Kim | H04B 17/318 |
| 2020/0178135 A1* | 6/2020 | Yun | H04W 36/0061 |
| 2020/0389831 A1* | 12/2020 | MacKenzie | H04W 36/32 |
| 2022/0046504 A1* | 2/2022 | Shrestha | H04W 36/06 |
| 2022/0217607 A1* | 7/2022 | Lin | H04W 36/165 |

FOREIGN PATENT DOCUMENTS

| | | |
|---|---|---|
| CN | 111406438 A | 7/2020 |
| EP | 2849466 A1 | 3/2015 |
| EP | 4102890 A1 | 12/2022 |
| EP | 4185006 A1 | 5/2023 |
| WO | 2018205885 | 11/2018 |
| WO | 2018233545 | 12/2018 |
| WO | 2021236609 A1 | 11/2021 |

OTHER PUBLICATIONS

European Patent Application No. 20949084.6, Extended European Search Report, Jun. 16, 2023, 15 pages.

International Patent Application No. PCT/CN2020/108972, International Preliminary Report on Patentability, Feb. 23, 2023, 6 pages.

Vocabulary, TSG-RAN Meeting #4, TSG#4(99)401, TR25.990 V0.1.4, Jun. 1999, 16 pages.

International Patent Application No. PCT/CN2020/108972, International Search Report and Written Opinion, Mailed on May 12, 2021, 9 pages.

3rd Generation Partnership Project; Technical Specification Group Radio Access Network; Technical Specification Group Services and System Aspects; System architecture for the 5G System (5GS); Stage 2 (Release 16), 3GPP TS 23.501 V16.5.1, Aug. 2020, 440 pages.

3rd Generation Partnership Project; Technical Specification Group Radio Access Network; NG-RAN; NG Application Protocol (NGAP) (Release 16), 3GPP TS 38.413 V16.2.0, Jul. 2020, 462 pages.

3rd Generation Partnership Project; Technical Specification Group Radio Access Network; Technical Specification Group Radio Access Network; NG-RAN; Xn application protocol (XnAP) (Release 16), 3GPP TS 38.423 V16.2.0, Jul. 2020, 447 pages.

India Patent Application No. 202317006529, First Examination Report, Nov. 21, 2023, 5 pages.

3rd Generation Partnership Project; Technical Specification Group Radio Access Network; NR; NR and NG-RAN Overall Description; Stage 2 (Release 16), 3GPP TS 38.300 V16.2.0, Jul. 2020, 148 pages.

China Patent Application No. 202080104446.2, Office Action, Jul. 17, 2024, 16 pages.

* cited by examiner

TECHNOLOGIES FOR SYNCHRONIZATION SIGNALING DURING HANDOVERS

CROSS REFERENCE TO RELATED APPLICATION

This application is the U.S. National Phase of PCT Application No. PCT/CN2020/108972, filed Aug. 13, 2020, the disclosure of which is incorporated by reference.

BACKGROUND

Third Generation Partnership Project (3GPP) networks rely on a large number of geographically distributed base stations to provide cellular coverage over expansive areas. A user equipment (UE) may travel between areas covered by different base stations. A source base station may handover communications to a target base station as the UE moves between cells to provide continuous, uninterrupted service to the UE. 3GPP working groups are investigating techniques for mobile base stations to enable operation of New Radio (NR) protocols in various access networks, including non-terrestrial access networks. For example, discussions are on-going in at least the radio access network 2 (RAN2) working group. Further consideration of handovers and coordinated cellular coverage is needed in such access networks.

DETAILED DESCRIPTION

Figure 1:
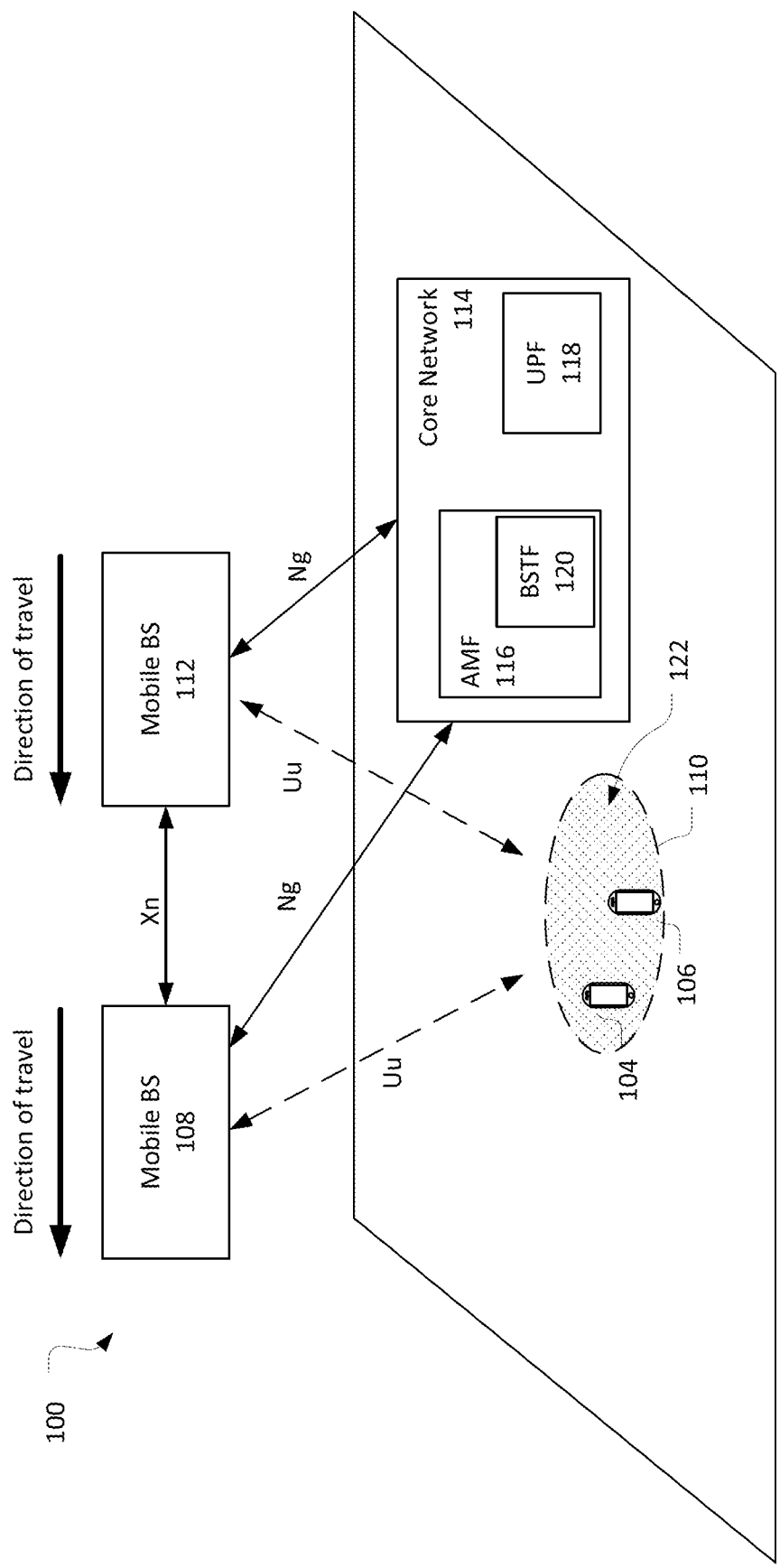
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

Typical 3GPP networks are constructed under an assumption that base stations are deployed in a stationary manner to provide cellular coverage at fixed locations. Mobility of the UE and mobility management procedures, in general, are based on the stationary cell deployment assumption. In some deployments with mobile base stations, such an assumption may still hold, and the networks may handle it as UEs to be the moving entities. If a mobile base station were to provide a radio access cell, the UEs would detect a decrease in the signal quality as the mobile base station moved away from the UE. The UE would then consider this a UE mobility operation and reselect a new cell that has moved into a location. To do this, the UE would need to read synchronization/reference signals and system information provided by the new cell, reconfigure itself to read the paging channels based on the new cell, and restart serving/neighbor cell measurements as needed. In some cases, the UE may need to trigger a tracking area update if the new cell is from a different registration area. This may result in a large number of UEs trying to update a cell at the same time, causing unnecessary signaling overload and large latency. For UEs in radio resource control (RRC)-connected mode, a handover may be required, which may involve signaling with both the departing base station and the arriving base station. This may also be a source of signaling latency, especially in the event the mobile base station is a large distance away from the UE.

To address these challenges associated with providing radio access cells by mobile stations, various embodiments describe techniques to utilize mobile base stations to provide stationary radio access cells.

FIG. 1 illustrates a network environment 100 in accordance with some embodiments. The network environment 100 may include a UE 104, UE 106, mobile base station (BS) 108, and mobile BS 112.

The mobile BSs 108/112 may be base stations that are configured to provide radio access cells (or "serving cells") for geographical locations in the vicinity of the mobile BS. The mobile BSs 108/112 may be terrestrial or non-terrestrial base stations that are capable of moving relative to geographical locations, typically on fixed or predetermined routes. For example, the mobile BSs 108/112 may be provided by vehicles, trains, unmanned aerial vehicles, airplanes, satellites of various altitude classifications (for example, low-earth orbit, medium-earth orbit, geosynchronous earth orbit, or high-earth orbit), etc.

The UEs 104/106 are depicted as mobile phones. However, the UEs 104/106 may be any type of user equipment such as computers, tablets, industrial wireless sensors, video surveillance/monitoring devices, wearable devices, vehicles, vehicles equipped with wireless connections, Internet of things (IoT) devices, etc.

The mobile BSs 108/112 may be configured to provide stationary serving cells at set geographical locations. For example, the mobile BS 108 may initially provide a serving cell 110 for a geographical location 122 that encompasses both UEs 104/106. As the mobile BS 108 moves away from the geographical location 122, the mobile BS 112 moves toward the geographical location 122 and the mobile BS 112 may take over the provision of the same serving cell 110. To provide the same serving cell 110, the mobile BS 112 may transmit the appropriate system information (SI) and broadcast information for the cell and may take over the communications to/from the UEs 104/106. The SI/broadcast information may include, for example, synchronization signals and physical broadcast channel (PBCH) blocks (SSBs) transmitted to provide, for example, physical cell identity and master information block (MIB); and other system information blocks (SIBS) transmitted in a physical downlink shared channel (PDSCH). In this manner, the arriving base station may seamlessly take over the identity and responsibilities of the departing base station. The transference of the provisioning of the serving cell 110 from the mobile BS 108 to the mobile BS 112 may be transparent to the UEs 104/106 in some embodiments. The UEs 104/106 may see the cell coverage as stationary and may not know that it is now being provided by a different mobile BS. As this transfer is transparent to the UEs 104/106, they may not incur any signaling latency due to the UE communications required with the source/target base stations in traditional handovers.

The serving cell 110 may provide the UEs 104/106 with an air interface compatible with a 3GPP New Radio (NR) access technology or 3GPP Long Term Evolution (LTE) access technology. The mobile BSs 108/112 may in turn communicate with a core network 114, which may be, for example, a 3GPP Fifth Generation (5G) core network (5GC). The mobile BSs 108/112 may be referred to as radio access node, ng-eNBs (which provide an LTE access network and connect to a 5GC), gNBs (which provide an NR access network and connect to a 5GC), or access nodes utilizing technologies of sixth generation (6G) and beyond.

The mobile BSs 108/112 may communicate with the UEs 104/106 over Uu interfaces, with one another over an Xn interface, and with the core network 114 over a next-generation (NG) interface. In some embodiments, the mobile BSs 108/112 may be coupled with an access and mobility management function (AMF) 116 of the core network 114 with an NG-control (NG-C) interface and with a user plane function (UPF) 118 of the core network 114 with an NG-user (NG-U) interface.

The NG-C interface may use a next-generation application protocol (NGAP) to transfer signaling messages between the mobile BSs 108/112 and the AMF 116, which may be a control plane function that provides registration management, connection management, reachability management, and mobility management services. Registration management may allow a UE to register and deregister with a 5G system. Upon registration, the UE context may be created within the core network 114. The UE context may be a set of parameters that identify and characterize the UE. The UE context may include UE identity information, UE capability information, access and mobility information, or protocol data unit (PDU) session information. Connection management may be used to establish and release control plane signaling connection between a UE and the AMF 116. Establishing a control plane signaling connection moves a UE from connection management (CM)-idle to CM-connected. Reachability management may allow a UE to be found and paged when a mobile terminated connection is desired. Mobility management may be used to maintain knowledge of a UE's location within a network.

In some embodiments, the AMF 116 may include a base station tracking function (BSTF) 120. The BSTF 120 may be programmed with routing information for each mobile base station including, for example, mobile BSs 108/112. The routing information may enable the BSTF 120 to determine a location of the mobile BSs 108/112 at a particular time. This information may be used to provide the mobile BSs 108/112 with the relevant information about neighbor base stations, upcoming geographical locations and related cell information, etc. In some embodiments, this may reduce the amount of information needed to be directly exchanged between the mobile BSs 108/112 over the Xn interface while the mobile BSs 108/112 are transferring cell provisioning responsibilities.

The UPF 118 may provide for routing and forwarding user plane packets between mobile BSs 108/112 and an external network. The mobile BSs 108/112 may transmit uplink packets to the UPF 118 through a general packet radio service (GPRS) tunneling protocol-user plane (GTP-U) tunnel. The UPF 118 may remove the packet headers and forward the packets into the external data network. The UPF 118 may map downlink packets arriving from an external data network onto specific quality of service flows belonging to specific PDU sessions before forwarding to the mobile BSs 108/112.

The Xn interface between mobile BS 108 and mobile BS 112 may include a control plane interface (Xn-C) for transferring signaling messages between neighboring base stations and a user plane interface (Xn-U) for transferring data between neighboring base stations. The mobile BSs 108/112 may use the Xn interface for basic mobility procedures, dual connectivity procedures, and global procedures. The basic mobility procedures include, but are not limited to, UE handover preparation and control, radio access network paging, receiving UE context, and sequence number (SN) status transfer. The dual connectivity procedures relate to adding, removing, and managing master and secondary nodes for dual connectivity operation. The global procedures include, but are not limited to, Xn set up and removal, cell activation, and handover report.

In a typical operation, the Xn interface may be set up through an automatic neighbor relation procedure (ANR) in which a UE discovers an identity of a neighbor cell for a serving cell. The serving cell may then send a query to the AMF for an appropriate IP address of the neighbor base station. The AMF would then query the neighbor node to obtain the IP address, which would then be transmitted back to the source base station. However, in some embodiments described herein, the UEs may have no knowledge of the two different base stations and reliance on the UE procedures of the ANR may not be possible. Thus, the Xn interface may be set up in other manners. For example, in some embodiments, the BSTF 120 may provide the mobile BS 108 and the mobile BS 112 with information (such as IP addresses) to facilitate the establishment of the Xn interface.

In order to take over the provisioning of the cell 110, the mobile BS 112 may need a variety of status information with respect to the state of the cell 110 and the UEs that are currently being served by the cell 110. In some embodiments, the states or modes of operation of the UEs 104/106 may influence the type of information that needs to be acquired by the mobile BS 112. Consider, for example, that the UE 104 is in a RRC-connected mode at the time of transfer, while the UE 106 is in an RRC-idle mode. The connected UE 104 may be involved in active communications with the mobile BS 108 at the time of transferring cell provisioning responsibilities to the mobile BS 112. Therefore, the mobile BS 108 may provide the mobile BS 112 with UE-level information to allow the mobile BS 112 to take over the communications. The UE-level information may include status information such as, but not limited to, allocated uplink and downlink resources, status of in-flight communications (for example, hybrid automatic repeat request (HARQ) processes, transmission/reception buffers, status of paging/random access/mobility procedures, etc.), and so forth.

In some embodiments, concepts related to the stationary provision of a serving cell may be abstracted to other levels. For example, in some embodiments, the mobile BSs 108/110 may provide stationary deployment configuration of registration/tracking/location areas to facilitate the reachability/mobility management procedures of the AMF 116.

Figure 2:
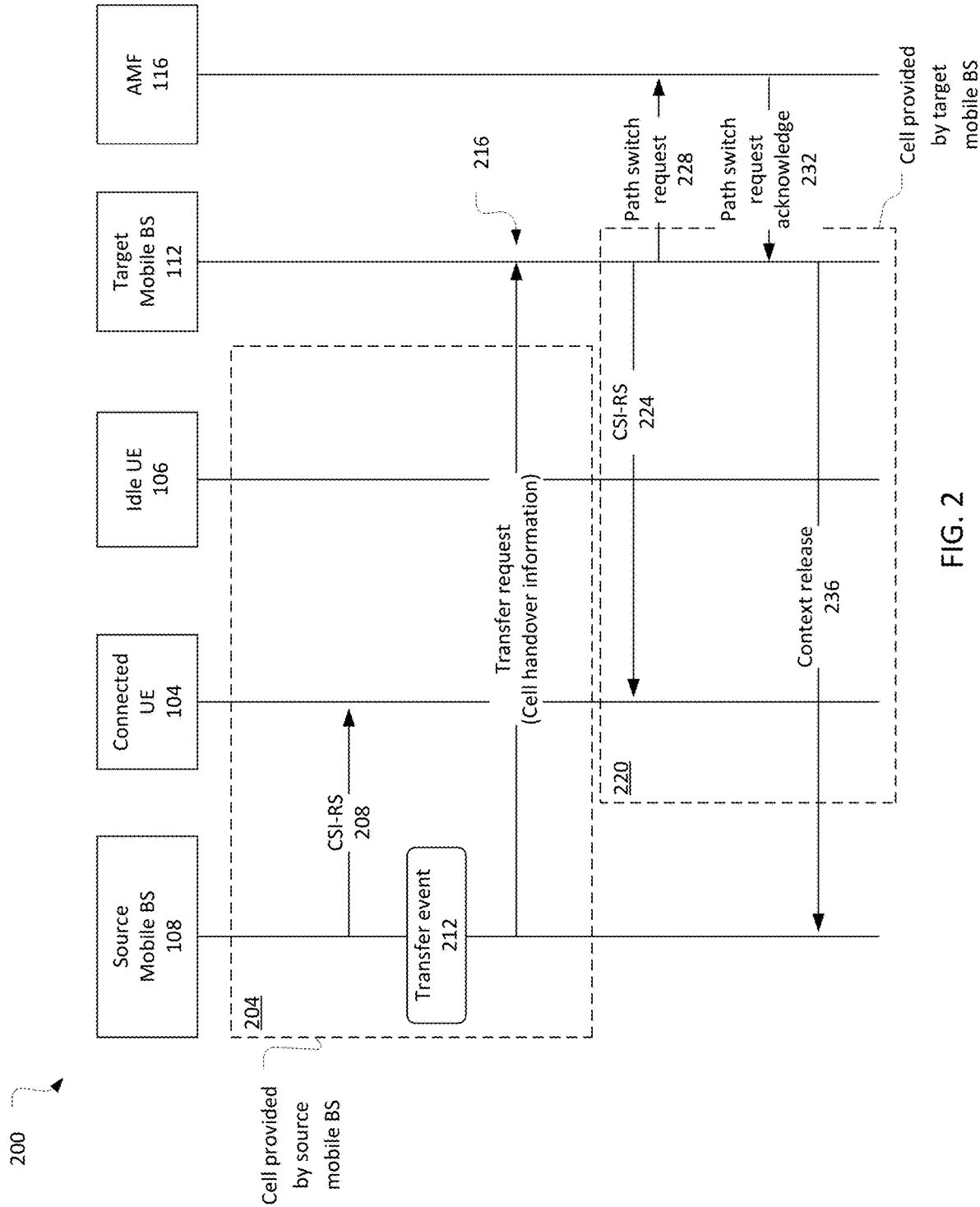
FIG. 2 illustrates a cell transfer procedure in accordance with some embodiments.

FIG. 2 illustrates a cell transfer procedure 200 in accordance with some embodiments. In this embodiment, the mobile BS 108 is transferring out of providing the serving cell 110 and may be referred to as the source mobile BS 108;

the mobile BS 112 is transferring into providing the serving cell 110 and may be referred to as the target mobile BS 112; the UE 104 is in an RRC-connected mode and may be referred to as connected UE 104; and the UE 106 is in an RRC-idle mode and may be referred to as idle UE 106.

At 204, the serving cell 110 may be provided by the source mobile BS 108. Providing the serving cell 110 may include transmitting SSBs and other information that will allow UEs to detect and associate with the serving cell 110. Providing the serving cell 110 may also include engaging in active communications with connected UEs such as connected UE 104. The active communications may include transmitting downlink data and system information on PDSCH, transmitting control information on a physical downlink control channel (PDCCH), receiving uplink data on a physical uplink shared channel (PUSCH), and receiving uplink control information on a physical uplink control channel (PUCCH). Engaging in active communications may also include transmitting channel state information-reference signal (CSI-RS) to the connected UE 104 at 208. The CSI-RS may be a multi-purpose downlink transmission to facilitate channel state information reporting, beam management, connected-mode mobility, radio link failure detection, beam failure detection and recovery, and fine tuning of time and frequency synchronization.

At 212, the source mobile BS 108 may detect a transfer event and decide to transfer the cell provisioning responsibilities. The transfer event may be based on the source mobile BS 108 leaving the vicinity of the geographical location 122. In some embodiments, the direction and speed of travel of the source mobile BS 108 may be used to determine proximity to the geographical location 122. In other embodiments, positioning circuitry (for example, positioning circuitry 1118 of FIG. 11) may be used to determine a location of the source mobile BS 108, which may then be compared to the geographical location 122. When the source mobile BS 108 determines its distance from the geographical location 122 is above a predetermined threshold distance, the source mobile BS 108 may make the transfer decision 212. In other embodiments, the transfer event 212 may be based on signaling from a core network (for example, the BSTF 120) or other controlling node.

At 216, the source mobile BS 108 may transmit a transfer request to the target mobile BS 112 over the Xn interface. The transfer request may include cell handover information that provides the target mobile BS 112 with sufficient information to take over the active communications and the transmission of the SSB and other information that allows UEs to detect and associate with the serving cell 110.

The cell handover information may include cell-level information that allows the target mobile BS to provide the SI/broadcast information. The cell-level information may include, for example, a physical cell identity, identity of resources used for cell-level transmissions, or any other cell-level information not specifically tied to a particular UE. In some embodiments, some or all of the cell-level information may be provided to the target mobile BS 112 in another manner. For example, the target mobile BS 112 may be pre-provisioned with the cell-level information so that it knows which identities it is to assume at a particular location at a particular time. As the cell-level information may not be expected to frequently change, it may be pre-programmed to each mobile BS to be used based on the location/time at which the mobile BS is in the vicinity of the geographical location 122.

In some embodiments, some or all of the cell-level information may be provided to the target mobile BS 112 from the BSTF 120. This information may be provided in a static manner, semi-static manner, periodic manner, or event-driven (for example, request driven) manner.

The cell handover information may further include UE-level information for each connected UE. The UE-level information may provide the target mobile BS 112 with the information regarding ongoing communication sessions to be relocated during the handover. The UE-level information may include configuration information that the target mobile BS 112 may use to determine time/frequency resources for a UE to transmit/receive control information/data. UE-level information may further include any other information specific to a particular UE.

In some embodiments, the UE-level information may include a globally unique AMF identity to provide the target mobile BS 112 with an identity of an AMF that is being used to serve the connected UE 104. The UE-level information may also include a UE context for the connected UE 104. The UE context may include, for example: an NG-C UE associated signaling reference to allow the target mobile BS 112 to address the connection when sending a Path Switch Request to the AMF 116 at 228; a signaling transport network layer (TNL) association address at a source NG-C side to provide an IP address for the signaling connection with the AMF 116; UE security capabilities; access stratum security information; index to radio access technology/frequency selection priority; UE aggregate maximum bit rate; PDU session resources to be set up list to provide IP address and transmission gap period-user (TGP-U) tunnel endpoint identifier (TEID) for uplink data transfer towards the UPF 118 and specify the PDU session and associated set of QoS flows; an RRC context with a handover preparation information message; location reporting information; or mobility restriction list.

In some embodiments, the UE-level information may further include an SN status transfer message to provide the target mobile BS 112 with information regarding a sequence number status at a packet data convergence protocol (PDCP) layer. The SN status transfer message may include an uplink count value to specify a sequence number of a first missing uplink service data unit (SDU), a downlink count value to specify a next sequence number to be allocated to a downlink SDU, and a received status of uplink PDCP SDU that indicates which uplink PDCP SDUs were received.

In some embodiments, the UE-level information may also include downlink data that is received by the source mobile BS 108 but is to be transmitted to the connected UE 104 by the target mobile BS 112 when providing the cell.

In some embodiments, the UE-level information may not include contexts for idle UEs such as idle UE 106. Given that the idle UE 104 was not in active communication with the source mobile BS 108 at the time of transfer, the source mobile BS 108 may not have its context information or even know that the idle UE 106 is camped in the geographical location 122. However, in some embodiments, the core network 114 may have information about a general tracking area of the idle UE 106 to facilitate paging in the event the network-initiated connection is desired. In the event the idle UE 106 may wish to initiate a connection, it may detect system information in the SSBs transmitted by the target mobile BS 112, engage in a random access procedure, and perform an RRC setup operation to transfer from an RRC idle mode to an RRC connected mode.

After the target mobile BS 112 receives the cell handover information, it may provide the cell at 220. Providing the cell at 220 may be similar to that described above with respect to providing the cell at 204 including, for example, transmission of the CSI-RS for the connected UE 104 at 224.

In some embodiments, the target mobile BS 112 may transmit a path switch request 228 to the AMF 116 to request that the UPF 118 modifies a bearer path so that downlink data is directed to the mobile BS 112 instead of the mobile BS 108. The AMF 116 may transmit content of the path switch request to a session management function (SMF) that is responsible for managing the UPF 118. The SMF may send a modify bearer request to the UPF 118, which responds with a modify bearer response, the contents of which are relayed to the AMF 116. The AMF 116 may then provide a path switch request acknowledge message to the target mobile BS 112 to acknowledge that the connection has been moved to the target mobile BS 112. In some embodiments, the target mobile BS 112 may transmit a context release message 236 to the source mobile BS 108 to trigger the source mobile BS 108 releasing resources it previously used for the connection.

In some embodiments, in addition to taking on the cell identity from the access-network perspective, the target mobile BS 112 may also take over the cell identity from the core-network perspective. For example, the target mobile BS 112 may assume an identity (for example, IP address) that is associated with the serving cell 110/geographical location 122 and used for purposes of communicating with the core network (including the AMF 116 and UPF 118). In this situation, the transfer from the mobile BS 108 to the mobile BS 112 may be at least partially transparent to the core network 114 and no path switch request/acknowledge may be needed.

In some embodiments, the AMF 116 may know in advance the schedule of when the different mobile BSs are to be providing a particular serving cell. Therefore, signaling between the mobile BSs 108/112 and the core network 114 to request path updates may be reduced or eliminated.

In some embodiments, after the target mobile BS 112 takes over the cell 110, a beam adjustment or refinement procedure may be desirable. For example, the transmit/receive beams used for communicating with the source mobile BS 108 may not necessarily be the most desirable for communicating with the target mobile BS 112. Thus, the connected UE 104 may enter a beam refinement/adjustment period using the CSI-RS 224 or other beam management signals transmitted by the target mobile BS 112. The effect of the change in direction of communication may be negligible when the mobile BSs 108/112 are a considerable distance from the connected UE 104. For example, when the mobile BSs 108/112 are implemented in satellite devices, the azimuthal angles from a surface of the earth to the mobile BSs 108/112 may be substantially the same.

Figure 3:
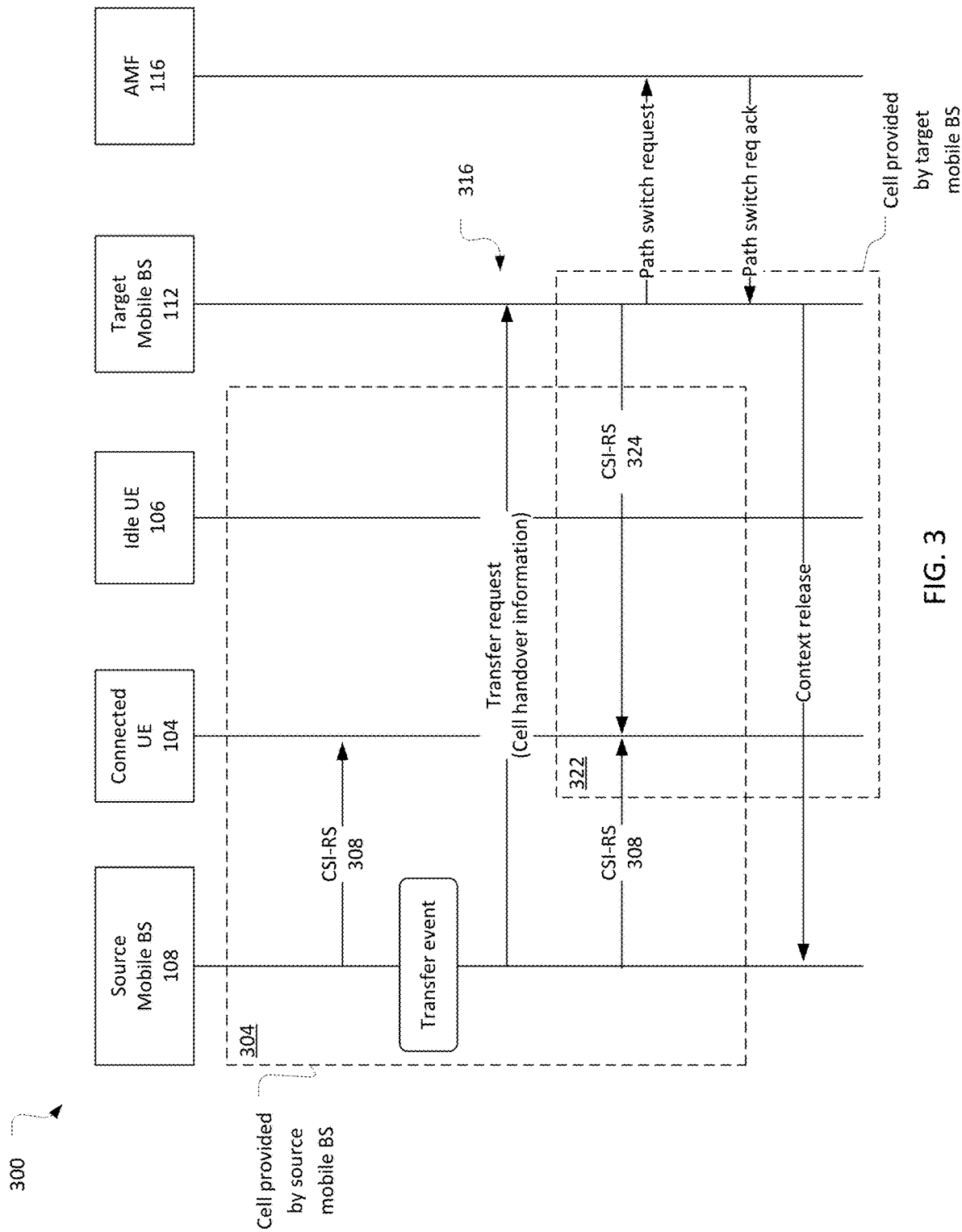
FIG. 3 illustrates a cell transfer procedure with overlapping coverage in accordance with some embodiments.

FIG. 3 illustrates a cell transfer procedure 300 in accordance with some embodiments. The operations and messages of cell transfer procedure 300 may be similar to like-named operations and messages of cell transfer procedure 200 described above with respect to FIG. 2. However, in contrast to cell transfer procedure 200, the cell transfer procedure 300 may include an overlapping provision of the serving cell 110 by the source mobile BS 108 and the target mobile BS 112 for a period of time.

In particular, after the source mobile BS 108 transmits the cell handover information to the target mobile BS 112 at 316, the source mobile BS 108 may continue to provide the serving cell 110 including, for example, transmission of the CSI-RS at 308. At this time, the serving cell 110 may also be provided by target mobile BS 112.

The overlapping provision of the serving cell 110 by both the source mobile BS 108 and the target mobile BS 112 may be similar to a single-frequency network operation or a joint transmission operation by multiple transmit-receive points (TRPs). In either case, similar to the overlapping provision of the serving cell 100, multiple base stations/TRPs transmit the same signals using the same resources.

The amount of time of the overlapping provision of the serving cell 110 may vary based on circumstances of a particular embodiment. For example, in some embodiments, the amount of time may be based on a speed of travel of the mobile BSs 108/112, distance between the mobile BSs 108/112, cell density, etc.

Figure 4:
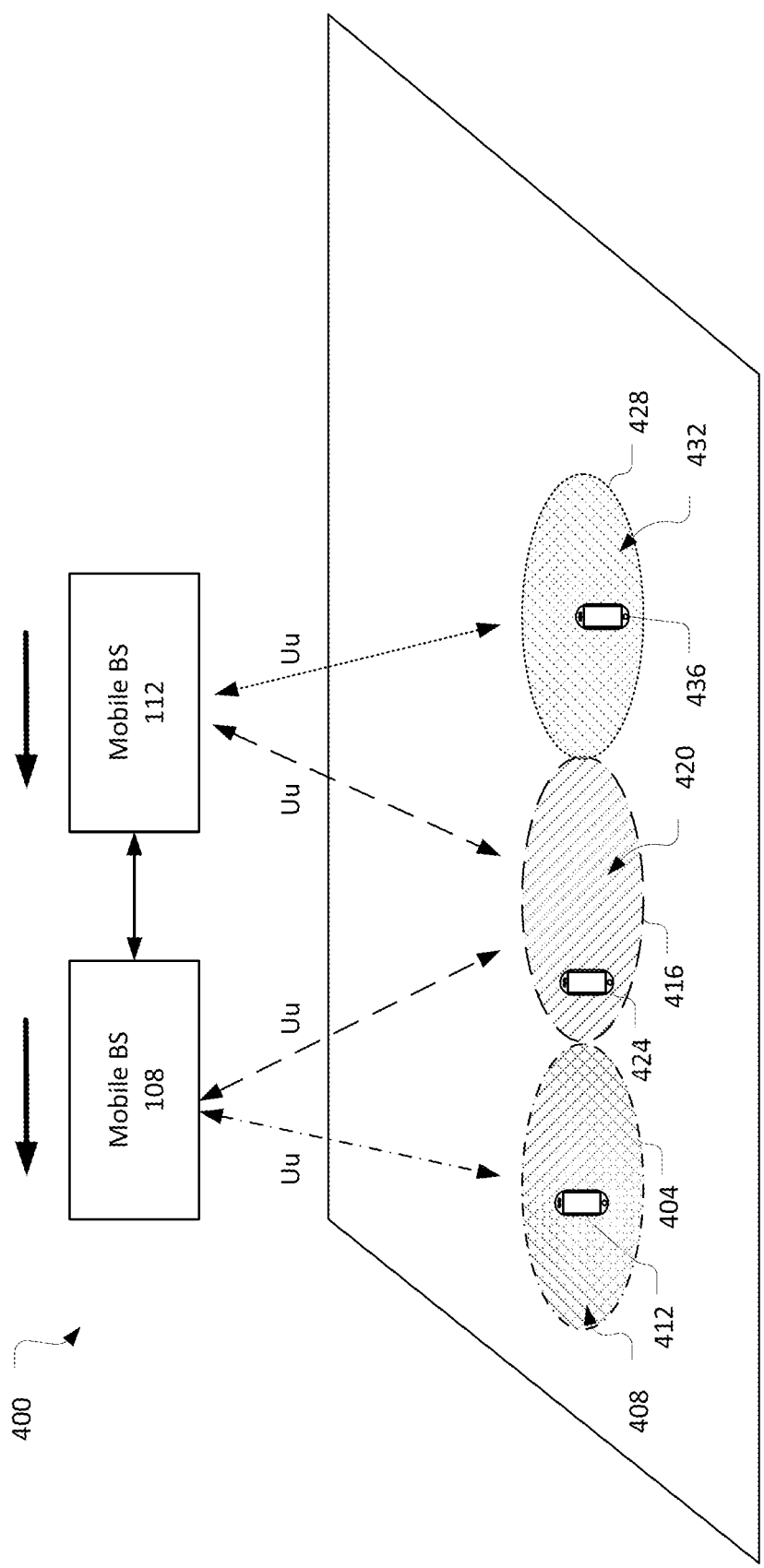
FIG. 4 illustrates a network environment in accordance with some embodiments.

FIG. 4 illustrates a network environment 400 in accordance with some embodiments. The network environment 400 may include the mobile BS 108 and the mobile BS 112, similar to that described above with respect to the network environment 100. In this embodiment, each of the mobile BSs 108/112 may utilize beamforming techniques to provide a plurality of serving cells at a given time. For example, the mobile BS 108 may provide, with its first beam, a first serving cell 404 at a first geographical location 408, where UE 412 is present. At the same time, the mobile BS 108 may also provide, with its second beam, a second serving cell 416 at a second geographical location 420, where UE 424 is present. The mobile BS 112 may also provide, with its first beam, the second serving cell 416 at the second geographical location 420 at the same time as the mobile BS 108. Thus, serving cell 416 may be provided by both mobile BSs 108/112 in an overlapping manner such as that described above with respect to FIG. 3. The mobile BS 112 may also provide, with its second beam, a third serving cell 428 at a third geographical location 432, where UE 436 is present.

When the mobile BS 108 ceases to provide the cell 416 at the geographical location 420, it may use its second beam to provide a serving cell in the direction that the mobile BS 108 is traveling.

In this manner, overlapping serving cell provision may provide some flexibility in the transition timing of switching from provision of a serving cell from one mobile BS to the next. Further, overlapping coverage may be provided at times in which the mobile BSs 108/112 are furthest from the geographical area. Therefore, the overlapping coverage may cause an effective boost to the signal-to-noise ratio (SNR) to prevent a deterioration of the signal seen by the UEs.

Figure 5:
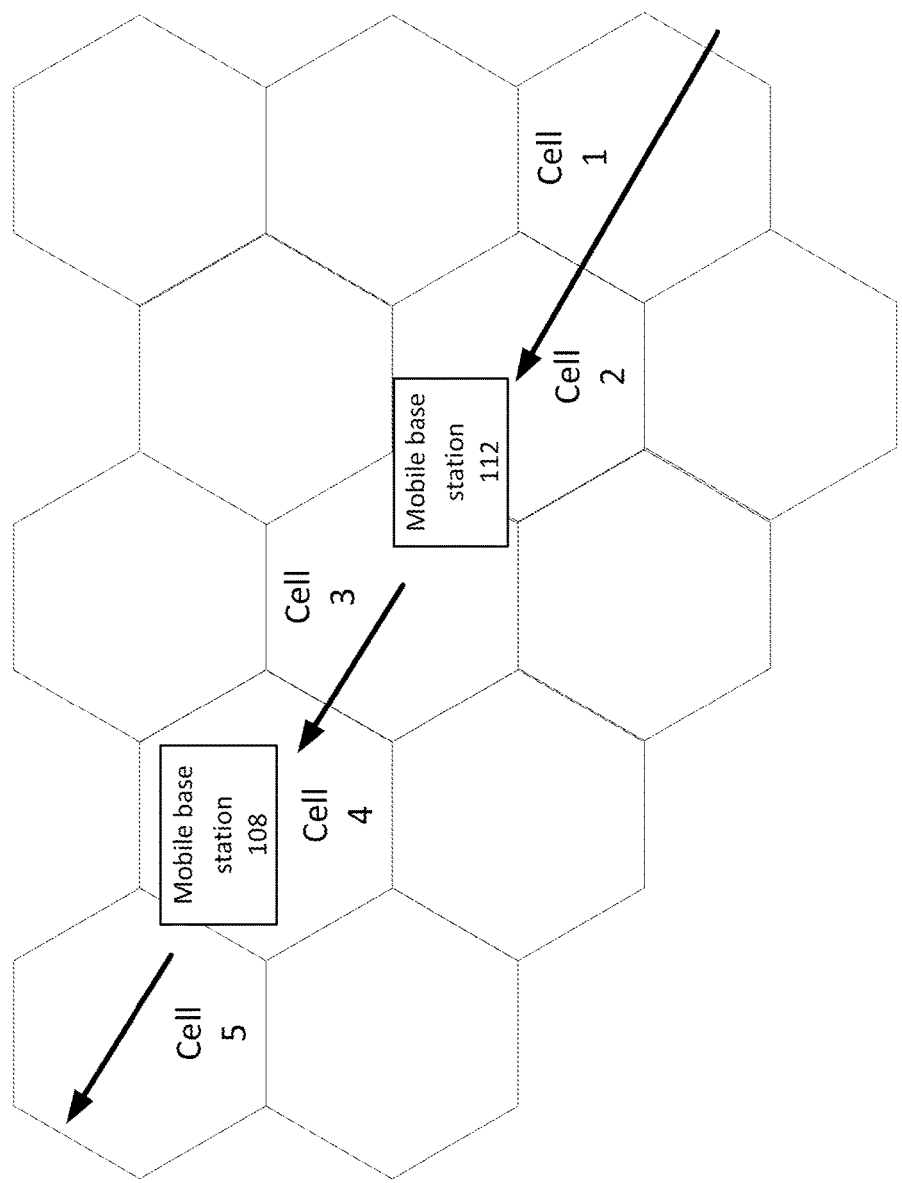
FIG. 5 illustrates a mapping overlay to facilitate network resource planning in accordance with some embodiments.

FIG. 5 illustrates a mapping overlay 500 to facilitate network resource planning in accordance with some embodiments. As discussed above, the path and speed of the mobile base stations 108/112 may be known in advance. Thus, it may be determined which cells are in the path of a particular mobile base station. As shown in the mapping overlay 500, both the mobile BS 108 and the mobile BS 112 may follow a similar path through cells 1, 2, 3, 4, and 5. In some embodiments, the trajectory of a mobile base stations may be relied upon for pre-provisioning of data to facilitate the serving cell handovers discussed herein. For example, in the present embodiment both mobile BSs 108/112 may be pre-provisioned with cell-level information for cells 1, 2, 3, 4, and 5. This may reduce or eliminate the amount of cell-level handover information transmitted between the mobile BSs 108/112 over the Xn interface at the time of a particular cell handover. In some embodiments, the pre-provisioning of the cell-level data may be done by the BSTF 120. Additionally/alternatively some or all of the cell-level data may be preconfigured in memory/storage of the mobile BSs 108/112, in which case configuration signaling may be reduced or eliminated.

In some embodiments, the route taken by a mobile base station may be used to facilitate other network operations. For example, one or more components of the network environment may use the routing information for positioning, radio link management, carrier aggregation coverage, or multi-subscriber identity module operation. For example, if a mobile base station or UE (provided with the relevant information) determines that both the mobile base station and the UE are traveling in a common direction, it may be advantageous for the mobile base station to retain UE status information given the high probability the UE will travel to a subsequent serving cell provided by the mobile BS. While embodiments of the present disclosure describe the mobility/interchangeability of the mobile base stations as being transparent to the UEs, the UEs may be provided at least some knowledge of this information in some embodiments.

Figure 6:
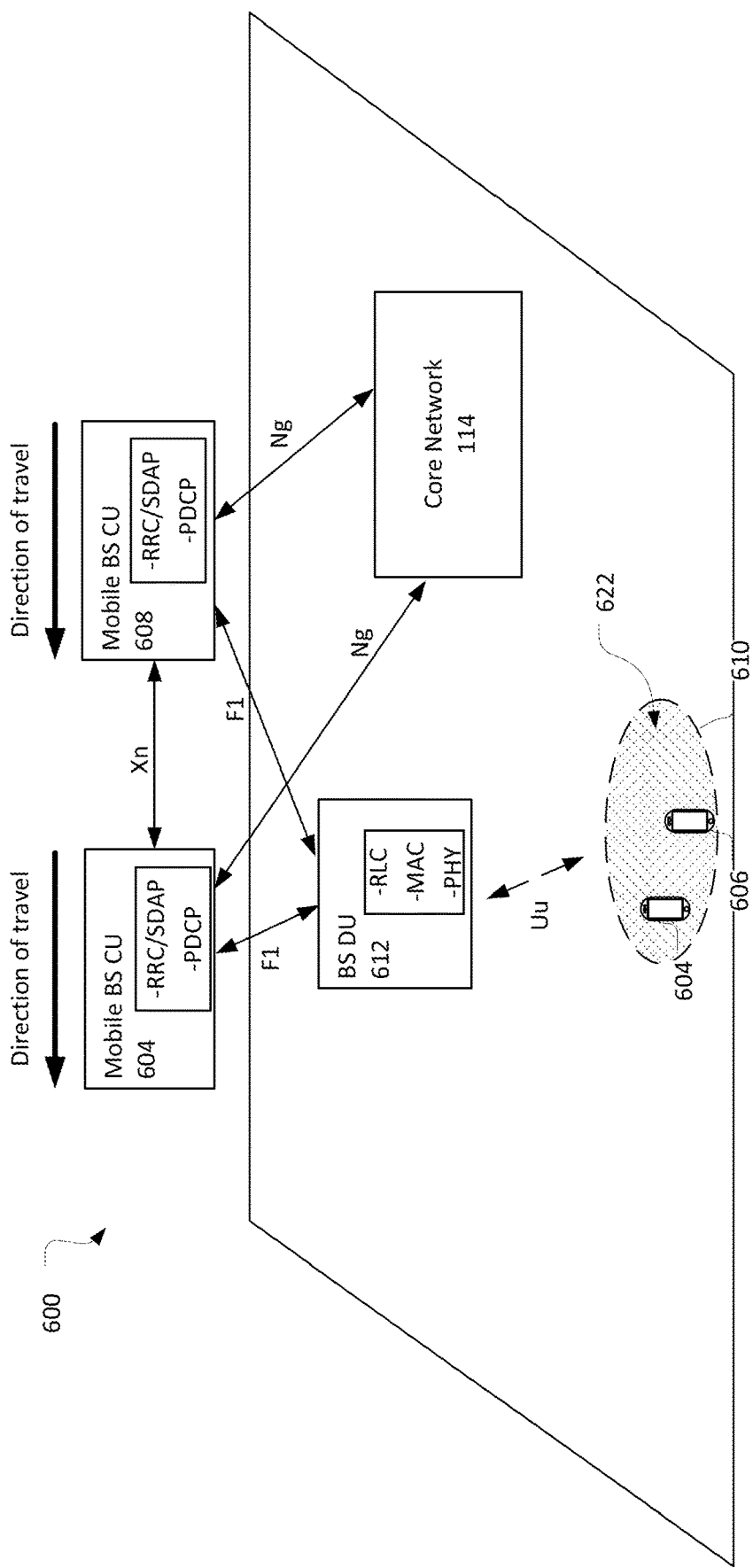
FIG. 6 illustrates a network environment with a mobile centralized unit in accordance with some embodiments.

FIG. 6 illustrates a network environment 600 in accordance with some embodiments. The network environment 600 may rely on a centralized unit (CU)-distributed unit (DU) split base station architecture. In particular, the network environment 600 may include mobile BS CUs 604/608 and a BS DU 612.

The mobile BS CUs 604/608 may provide upper layers of a communication protocol stack including, for example, RRC, service data adaptation protocol (SDAP), and PDCP layers. The RRC layer may provide connection establishment and release functions, broadcast of system information, radio bearer establishment, reconfiguration and release, mobility, and paging functions. The SDAP layer may map quality of service (QoS) flows to data radio bearers and mark QoS flow identifiers in both downlink and uplink packets. The PDCP layer may control transfer of user/control plane data, header compression, ciphering, and integrity protection.

The BS DU 612 may provide lower levels of the communication protocol stack including, for example, radio link control (RLC), media access control (MAC), and physical (PHY) layers. The RLC layer may transfer upper layer protocol data units in an acknowledged mode, unacknowledged mode, or transparent mode. The RLC layer may manage RLC service data units and protocol data units separately for each of these modes to provide error detection and recovery. The MAC layer may generate transport blocks from logical channel data received from the RLC layer, perform error correction through HARQ, and perform various control functions related to activating/deactivating secondary cells, triggering semi-persistent scheduled transmissions, reporting buffer status and power headroom, etc. The PHY layer provides for physical layer processing as well as transmission and reception across an air interface. The PHY layer may add cyclic redundancy check bits to transport blocks at a transmitter to allow error detection at a receiver. The PHY layers may also perform channel coding, interleaving, and modulation to efficiently transmit/receive information over the air interface.

The BS DU 612 may provide the Uu air interface for serving cell 610 for the UEs 104/106 at the geographical location 622. The BS DU 612 may be a stationary or mobile device. The mobile BS CUs 604/608 may be connected with the BS DU 612 over an F1 interface that may be used to transfer both control plane signaling and user plane data. The mobile BS CUs 604/608 may be coupled with each other via an Xn interface and with the core network 114 via an Ng interface as described above with respect to FIG. 1.

The mobile BS CU 604 may be initially coupled with the BS DU 612 to provide the higher layer functions for the serving cell 610. As the mobile BS CU 604 travels away from the BS DU 612 (and geographical location 622), it may transfer the higher-layer cell provisioning responsibilities to the mobile BS CU 608. The mobile BS CU 604 may provide cell handover information to the mobile BS CU 608 to facilitate the transfer of the higher-layer cell provisioning responsibilities. In some embodiments, a subset of the information provided above with respect to FIG. 2 may need to be provided to the mobile BS CU 608. For example, the BS DU 612 may include the information needed to provide the SI/broadcast information to facilitate access and discovery for the serving cell 610 and may also include low-layer UE status information (for example, with respect to HARQ processes). Therefore, this information may not need to be provided to the incoming mobile BS CU 608. Rather, the cell handover information transmitted over the Xn interface may be focused on the higher-layer functions applicable to the connected UEs.

The BS DU 612 may have more hardware resources than a typical UE in terms of processing power, size and number of antenna arrays, etc. Thus, in some embodiments, a signal between the BS DU 612 and the mobile BS CUs 604/608 may be capable of spanning larger distances. This may facilitate deployments using less mobile units to provide the same amount of coverage.

Figure 7:
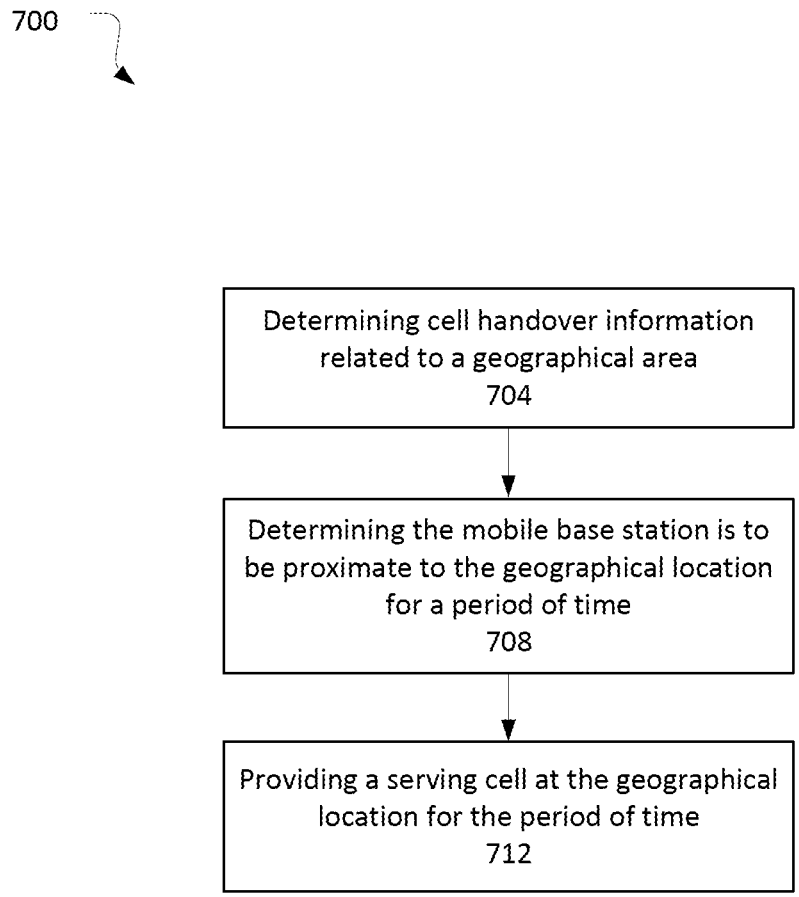
FIG. 7 illustrates an operational flow/algorithmic structure in accordance with some embodiments.

FIG. 7 may include an operation flow/algorithmic structure 700 in accordance with some embodiments. The operation flow/algorithmic structure 700 may be performed or implemented by a base station such as, for example, mobile BS 108/112, mobile BS CU 604/608, or device 1100; or components thereof, for example, baseband processor 1104A.

The operation flow/algorithmic structure 700 may include, at 704, determining cell handover information related to a geographical area. The cell handover information may be information relevant to providing a serving cell for the geographical area. The cell handover information may include both cell-level information and UE-level information. In some embodiments, a first portion of the cell handover information may be received from a core network device, for example, AMF 116 or BSTF 120. The first portion may include cell-level information or other information that is relatively stable and may be provided in advance. In some embodiments, a second portion of the cell handover information may be received from another mobile BS over an Xn interface. For example, the second portion may be provided by a source mobile BS that is transitioning out of the responsibility for providing a serving cell. The second portion may include UE-level information or other information that is relatively dynamic and conveys a present state of the serving cell at a time of the serving cell handover.

The operation flow/algorithmic structure 700 may further include, at 708, determining the mobile base station is to be proximate to the geographical location for period of time. Proximity to the geographical location may be defined differently for different embodiments. In general, proximity may be defined as a distance at which the mobile BS may provide adequate signaling over an appropriate air interface, for example, a Uu or F1 interface.

In some embodiments, the mobile base station may determine whether it is proximate to a geographical location based on location data corresponding to both the geographical location and the base station itself. In some embodiments, the mobile base station may determine its location using routing information, which may be preprogrammed to the mobile base station or provided by a network element such as, for example, AMF 116 or BSTF 120. Additionally/alternatively, the mobile base station may determine its location by utilizing positioning circuitry such as positioning circuitry 1118 of FIG. 11.

In some embodiments, such as those described with respect to FIG. 6, a mobile BS may rely on signaling with a stationary device at the geographical location (for example, BS DU 612) to determine proximity. For example, the mobile BS may determine whether it is proximate to the geographical location based on measurements of signals transmitted to, or received from, the stationary device. If, for example, the measurements provide signal metrics over a predetermined threshold, the mobile base station may determine that it is proximate to the geographical location; however, if the measurements provide signal metrics that are under the predetermined threshold, the mobile base station may determine that it is remote from the geographical location.

In some embodiments, the mobile base station may determine it is proximate to the geographical location for a period of time based on scheduling information. For example, it may be predetermined that the mobile base station will be in the vicinity of a particular geographical location for the period of time. This information may be preprogrammed at the mobile base station or provided, initially or as an update, from a network element such as, for example, AMF 116 or BSTF 120.

The operation flow/algorithmic structure 700 may further include, at 712, providing a serving cell at the geographical location during the period of time. Upon receiving the desired cell handover information, the mobile base station may assume responsibilities for providing the serving cell. This may include both transmission of SI/broadcast information to convey the presence and identity of the serving cell as well as transmitting/receiving downlink/uplink communications with connected UEs.

Figure 8:
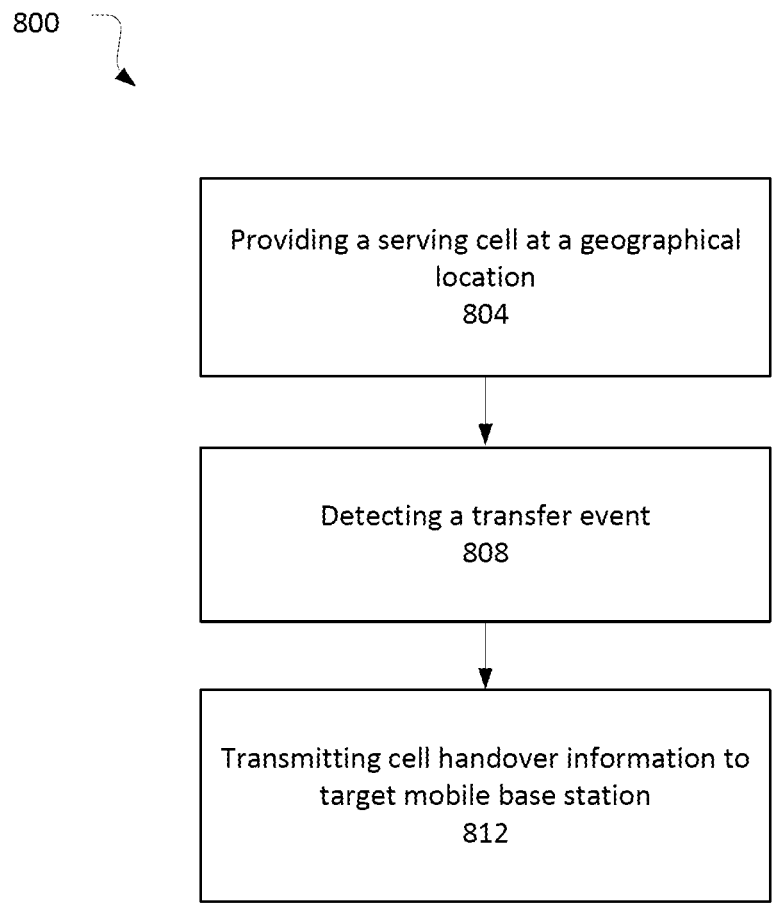
FIG. 8 illustrates an operational flow/algorithmic structure in accordance with some embodiments.

FIG. 8 may include an operation flow/algorithmic structure 800 in accordance with some embodiments. The operation flow/algorithmic structure 800 may be performed or implemented by a base station such as, for example, mobile BS 108/112, mobile BS CU 604/608, or device 1100; or components thereof, for example, baseband processor 1104A.

The operation flow/algorithmic structure 800 may include, at 804, providing a serving cell at a geographical location using one or more transmit/receive beams. Providing a serving cell may be similar to that described above with respect to operation 712 of FIG. 7 and elsewhere.

In some embodiments, the mobile base station may simultaneously provide a plurality of serving cell using various transmit/receive beams. These serving cells may align with a direction of travel of the mobile base station. For example, one serving cell ahead of the mobile base station and one serving cell behind the mobile base station.

The operation flow/algorithmic structure 800 may further include, at 808, detecting a transfer event. In some embodiments, the transfer event may be a determination that a distance from the mobile BS to the geographical location is beyond the predetermined threshold. For example, the mobile BS is no longer proximate to the geographical location. This may be done similar to that described above with respect operation 708 of FIG. 7 and elsewhere. In other embodiments, the transfer event may be a determination that the mobile BS is unable to provide adequate signaling or coverage for the serving cell. In still other embodiments, the transfer event may be based on scheduling information. For example, the mobile base station is to provide the serving cell for a predetermined period of time, the expiration of which may constitute the signaling event.

The operation flow/algorithmic structure 800 may further include, at 812, transmitting cell handover information to the target mobile base station to transfer provisioning of the serving cell to the target mobile base station. The cell handover information may be transmitted to the target mobile base station over an Xn interface.

In some embodiments, the identification of the target mobile station may be provided to the mobile base station from a network element such as, for example, AMF 116 or BSTF 120. The routing of all of the mobile base stations may be predefined, discoverable, or otherwise known to an entity in the core network. Therefore, the core network may provide a mobile base station with information as to which other mobile base station is to take over service of a particular serving cell. In other embodiments, the mobile base stations may engage in a peer discovery process to identify neighbor mobile base stations.

Figure 9:
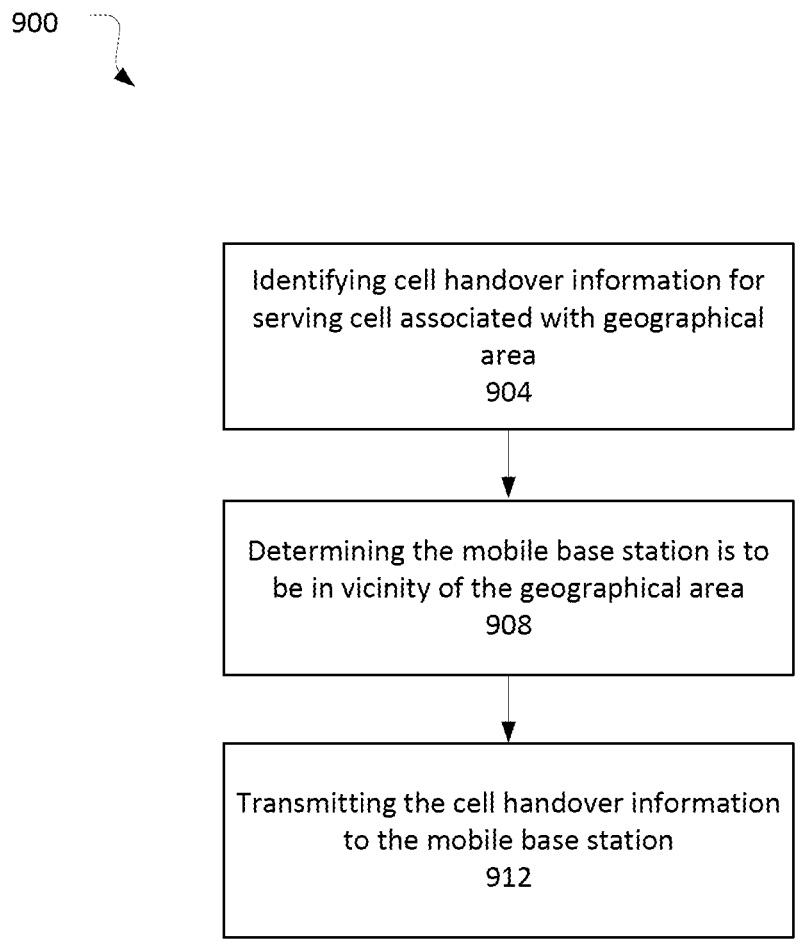
FIG. 9 illustrates an operational flow/algorithmic structure in accordance with some embodiments.

FIG. 9 may include an operation flow/algorithmic structure 900 in accordance with some embodiments. The operation flow/algorithmic structure 900 may be performed or implemented by a network element such as, for example, AMF 116, BSTF 120, or device 1100; or components thereof, for example, baseband processor 1104A.

The operation flow/algorithmic structure 900 may include, at 904, identifying cell handover information for a serving cell associated with a geographical area. The device may include this information in a relational database that associates geographical areas with serving cells according to a coordinated network plan. This association may be relatively static, but may be periodically updated in network optimization operations.

The operation flow/algorithmic structure 900 may further include, at 908, determining a mobile base station is to be in a vicinity of the geographical area. The device may include routing information for each mobile base station. The device may use this routing information to overlay a map that identifies the various serving cell/geographic locations. In this manner, the device may determine which serving cells are to be provided by a particular mobile base station.

The operation flow/algorithmic structure 900 may further include, at 912, transmitting the cell handover information to the mobile base station. The cell handover information may correspond to one serving cell or a plurality of serving cells that are to be provided by the mobile base station in the future. Further, the cell handover information may include cell-level information and, optionally, UE-level information.

Figure 10:
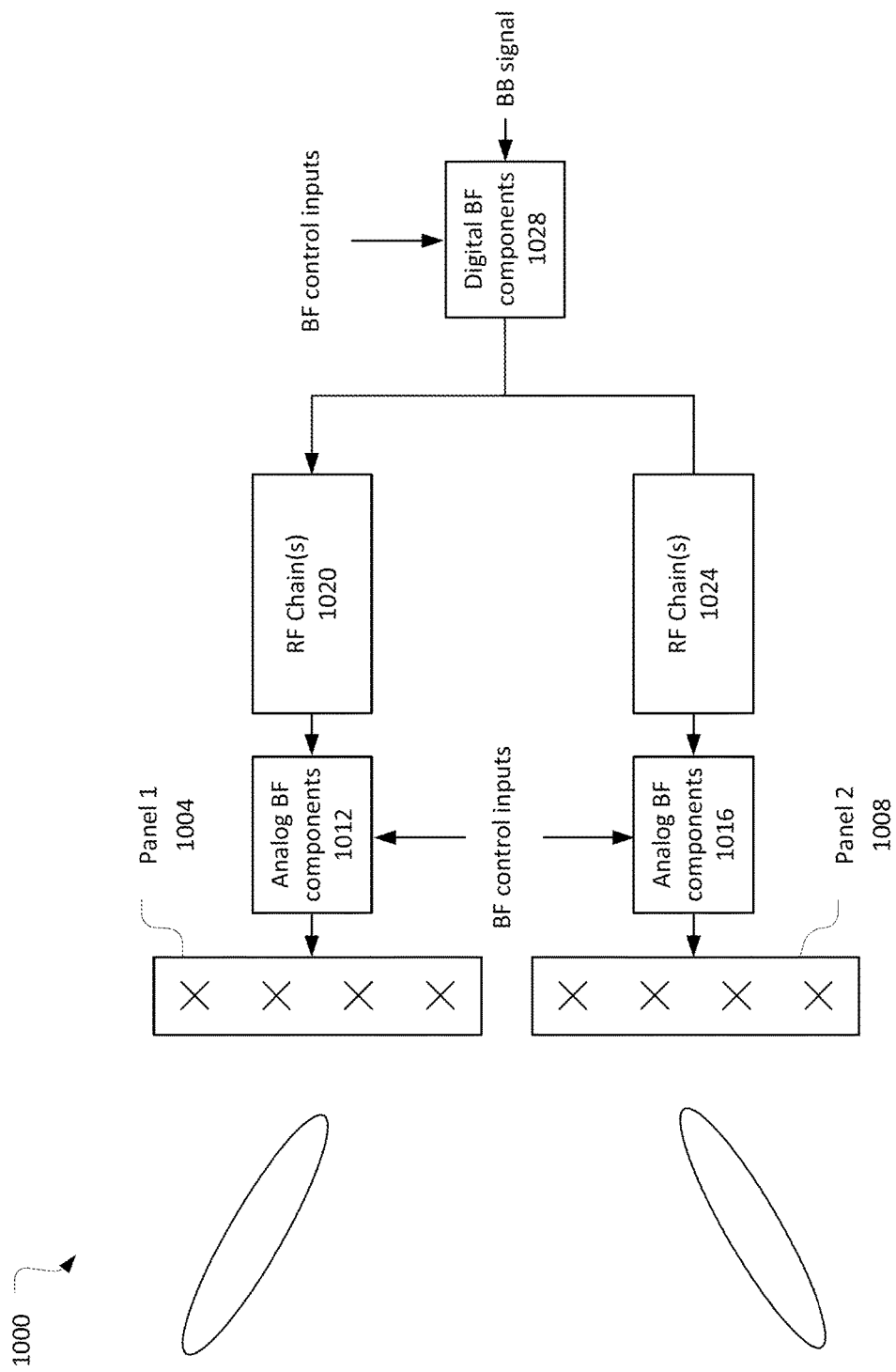
FIG. 10 illustrates beamforming circuitry in accordance with some embodiments.

FIG. 10 illustrates beamforming circuitry 1000 in accordance with some embodiments. The beamforming circuitry 1000 may include a first antenna panel, panel 1 1004, and a second antenna panel, panel 2 1008. Each antenna panel may include a number of antenna elements. Other embodiments may include other numbers of antenna panels.

Figure 11:
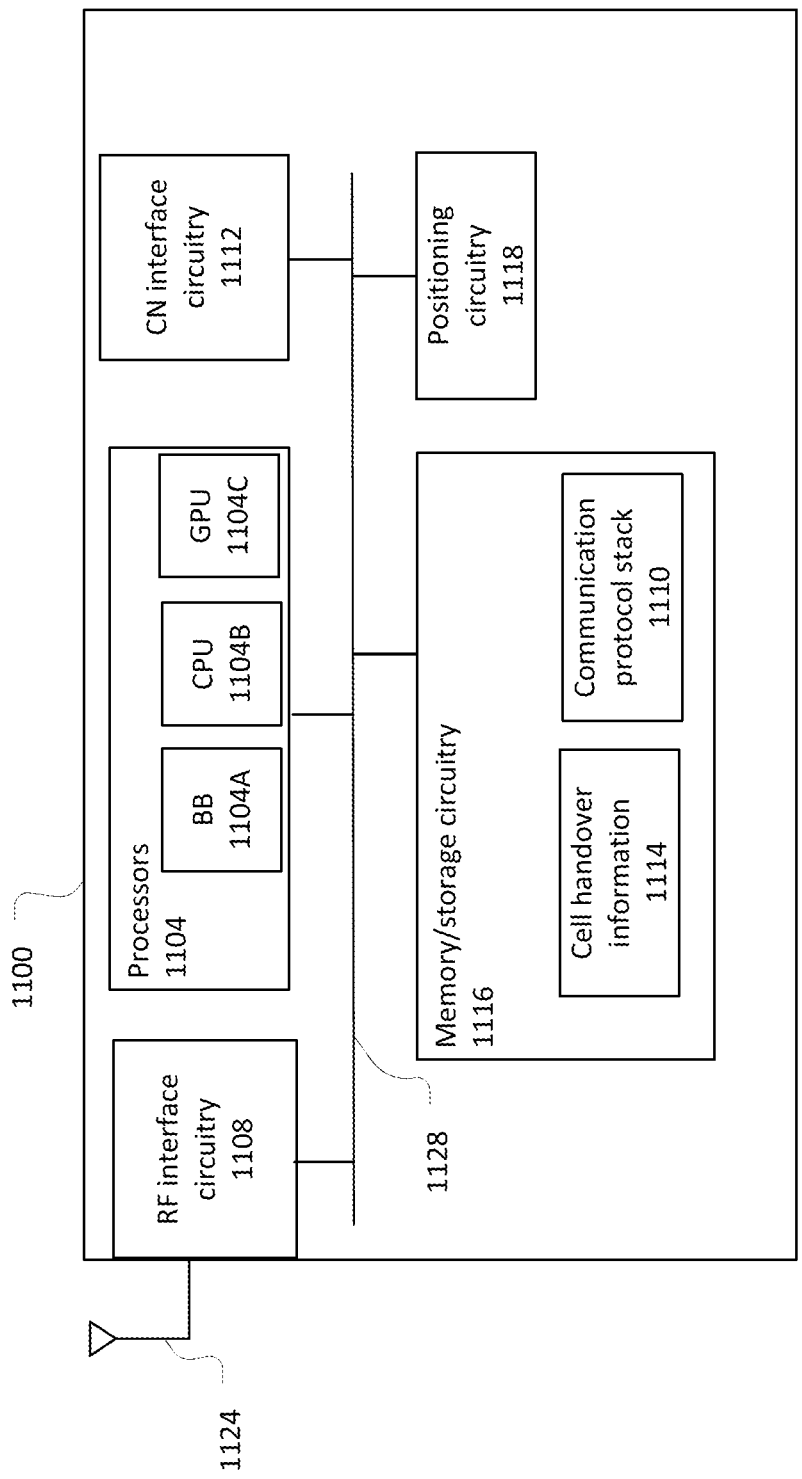
FIG. 11 illustrates a device in accordance with some embodiments.

Digital beamforming (BF) components 1028 may receive an input baseband (BB) signal from, for example, a baseband processor such as, for example, baseband processor 1104A of FIG. 11. The digital BF components 1028 may rely on complex weights to pre-code the BB signal and provide a beamformed BB signal to parallel radio frequency (RF) chains 1020/1024.

Each RF chain 1020/1024 may include a digital-to-analog converter to convert the BB signal into the analog domain; a mixer to mix the baseband signal to an RF signal; and a power amplifier to amplify the RF signal for transmission.

The RF signal may be provided to analog BF components 1012/1016, which may apply additionally beamforming by providing phase shifts in the analog domain. The RF signals may then be provided to antenna panels 1004/1008 for transmission.

In some embodiments, instead of the hybrid beamforming shown here, the beamforming may be done solely in the digital domain or solely in the analog domain.

In various embodiments, control circuitry, which may reside in a baseband processor, may provide BF weights to the analog/digital BF components to provide a transmit beam at respective antenna panels. These BF weights may be determined by the control circuitry to provide the directional provisioning of the serving cells as described herein. In some embodiments, the BF components and antenna panels may operate together to provide a dynamic phased-array that is capable of directing the beams in the desired direction.

FIG. 11 illustrates a device 1100 in accordance with some embodiments. The base station 1100 may be similar to and substantially interchangeable with mobile base stations 118/112; mobile BS CUs 604/608; BS DU 612; AMF 116; or BSTF 120.

The base station 1100 may include processors 1104, RF interface circuitry 1108, core network (CN) interface circuitry 1112, memory/storage circuitry 1116, and positioning circuitry 1118. The components of the device 1100 may be implemented as integrated circuits (ICs), portions thereof, discrete electronic devices, or other modules, logic, hardware, software, firmware, or a combination thereof. The block diagram of FIG. 11 is intended to show a high-level view of some of the components of the device 1100. However, some of the components shown may be omitted, additional components may be present, and different arrangement of the components shown may occur in other implementations.

The components of the base station 1100 may be coupled with various other components over one or more interconnects 1128, which may represent any type of interface, input/output, bus (local, system, or expansion), transmission line, trace, optical connection, etc. that allows various circuit components (on common or different chips or chipsets) to interact with one another.

The processors 1104 may include processor circuitry such as, for example, baseband processor circuitry (BB) 1104A, central processor unit circuitry (CPU) 1104B, and graphics processor unit circuitry (GPU) 1104C. The processors 1104 may include any type of circuitry or processor circuitry that executes or otherwise operates computer-executable instructions, such as program code, software modules, or functional processes from memory/storage 1116 to cause the device 1100 to perform operations as described herein.

In some embodiments, the baseband processor circuitry 1104A may access a communication protocol stack 1110 in the memory/storage 1116 to communicate over a 3GPP compatible network. In general, the baseband processor circuitry 1104A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum (NAS) layer. In some embodiments, the PHY layer operations may additionally/alternatively be performed by the components of the RF interface circuitry 1108.

The baseband processor circuitry 1104A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The baseband processor circuitry 1104A may also access cell handover information 1114 from memory/storage 1116 to identify the information needed to assume responsibilities for provisioning a cell at a particular geographical location.

The memory/storage 1116 may include any type of volatile or non-volatile memory that may be distributed throughout the device 1100. In some embodiments, some of the memory/storage 1116 may be located on the processors 1104 themselves (for example, L1 and L2 cache), while other memory/storage 1116 is external to the processors 1104 but accessible thereto via a memory interface. The memory/storage 1116 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1108 may include transceiver circuitry and radio frequency front module (RFEM) that allows the device 1100 to communicate with other devices over an air interface. The air interface may be an access cell or wireless backhaul. The RF interface circuitry 1108 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 1124 and proceed to filter and amplify (with a low-noise amplifier) the signal. The signal may be provided to a receiver of the transceiver that down-converts the RF signal into a baseband signal that is provided to the baseband processor circuitry 1104A.

In the transmit path, the transmitter of the transceiver up-converts the baseband signal received from the baseband processor circuitry 1104A and provides the RF signal to the RFEM. The RFEM may amplify the RF signal through a power amplifier prior to the signal being radiated across the air interface via the antenna 1124.

In various embodiments, the RF interface circuitry 1108 may be configured to transmit/receive signals in a manner compatible with NR access technologies or 5G backhaul technologies.

The antenna 1124 may include a number of antenna elements that each convert electrical signals into radio waves to travel through the air and to convert received radio waves into electrical signals. The antenna elements may be arranged into one or more antenna panels. The antenna 1124 may have antenna panels that are omnidirectional, directional, or a combination thereof to enable beamforming and multiple input, multiple output communications. The antenna 1124 may include microstrip antennas, printed antennas fabricated on the surface of one or more printed circuit boards, patch antennas, phased array antennas, etc. The antenna 1124 may have one or more panels designed for specific frequency bands including bands in FR1 or FR2.

The CN interface circuitry 1112 may be provided when the device is used as a core network device to connect with other elements of the core network. The CN interface circuitry 1112 may use a 5GC-compatible network interface protocol such as carrier Ethernet protocols, or some other suitable protocol. The CN interface circuitry 1112 may include one or more dedicated processors or FPGAs to communicate using one or more of the aforementioned protocols. In some implementations, the CN interface circuitry 1112 may include multiple controllers to provide connectivity to other networks using the same or different protocols.

The positioning circuitry 1118 includes circuitry to receive and decode signals to determine a position of the mobile base station 1100. In some embodiments, the signals may be transmitted/broadcasted by a positioning network of a global navigation satellite system (GNSS). The positioning circuitry 1118 may include various hardware elements (for example, switches, filters, amplifiers, antenna elements, etc.) to communicate with components of the positioning network, such as navigation satellite constellation nodes. In some embodiments, the positioning circuitry 1118 may include a micro-technology for positioning, navigation, and timing (Micro-PNT) IC that uses a master timing clock to perform position tracking/estimation without GNSS assistance. The positioning circuitry 1118 may also be part of, or interact with, the baseband processor 1104A or RF interface circuitry 1108 to communicate with the nodes and components of the positioning network. The positioning circuitry 1118 may also provide position data and/or time data to the processors 1104, which may use the data to synchronize operations with various infrastructure, or the like.

One aspect of the present technology is the gathering and use of data available from specific and legitimate sources to improve the provisioning of cellular network coverage. The present disclosure contemplates that in some instances, this gathered data may include personal information data that uniquely identifies or can be used to identify a specific person or user device. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to provide a seamless delivery of radio access network coverage.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of operating a mobile base station, the method comprising: determining cell handover information related to a geographical location; determining the mobile base station is to be proximate to the geographical location for a period of time; and providing, based on the cell handover information, a serving cell at the geographical location during the period of time.

Example 2 includes the method of example 1 or some other example herein, wherein providing the serving cell comprises: transmitting, based on the cell handover information, synchronization signals and system information corresponding to the serving cell.

Example 3 includes the method of example 1 or some other example herein, further comprising: determining user equipment (UE)-level information corresponding to a UE in a radio resource control (RRC) connected mode within the serving cell.

Example 4 includes the method of example 3 or some other example herein, further comprising: receiving a transfer request from a source mobile base station over an Xn interface, the transfer request to include the UE-level information.

Example 5 includes the method of example 4 or some other example herein, wherein providing the serving cell comprises: transmitting, to the UE, channel state information-reference signals.

Example 6 includes the method of example 1 or some other example herein, further comprising: accessing route information to determine a scheduled route of the mobile base station; and determining at least a portion of the cell handover information and the geographical location based on the scheduled route.

Example 7 includes the method of example 6 or some other example herein, further comprising: receiving a transfer request from a source mobile base station, the transfer request to include at least a portion of the cell handover information.

Example 8 includes the method of example 6 or some other example herein, further comprising: receiving, from a base station tracking function in a core network, a message with the route information or at least a portion of the cell handover information.

Example 9 includes the method of example 1 or some other example herein, further comprising: transmitting, concurrently with the source mobile base station, channel state information-reference signals (CSI-RSs) to one or more connected user equipments in the serving cell.

Example 10 includes the method of example 1 or some other example herein, wherein the mobile base station is a mobile base station centralized unit (CU) and, providing the serving cell comprises: providing radio resource control (RRC), service data adaption protocol (SDAP), or packet data convergence protocol (PDCP) layer operations; and controlling a mobile base station distributed unit (DU) to provide an air interface for the serving cell.

Example 11 includes a method of operating a mobile base station, the method comprising: providing a serving cell for a geographical location; detecting a transfer event; and transmitting, based on the transfer event, cell handover information to a target mobile base station to transfer provisioning of the serving cell to the target mobile base station.

Example 12 includes the method of example 11 or some other example herein, wherein the cell handover information includes user equipment (UE)-level information for each UE in a connected mode with the mobile base station.

Example 13 includes the method of example 12 or some other example herein, wherein the UE-level information includes a UE context for a first UE.

Example 14 includes the method of example 12 or some other example herein, wherein the cell handover information includes cell-level information related to a primary cell identity associated with the serving cell.

Example 15 includes the method of example 14 or some other example herein, further comprising: receiving the cell-level information from a base station tracking function in a core network based on a route of the mobile base station.

Example 16 includes the method of example 12 or some other example herein, wherein the serving cell is a first serving cell, the geographical location is a first geographical location, and the method further comprises: providing a second serving cell at a second geographical location.

Example 17 include the method of example 16 or some other example herein, wherein the mobile base station is a low Earth orbit satellite device.

Example 18 includes a method of operating a core network function, the method comprising: identifying cell handover information for a serving cell associated with a geographical area; determining a mobile base station is to be in a vicinity of the geographical area; and transmitting, based on said determining the mobile station is to be in the vicinity, the cell handover information to the mobile base station.

Example 19 includes the method of example 18 or some other example herein, further comprising: receiving, from the mobile base station, a path switch request; updating a bearer path to reflect downlink transmissions to a user equipment are to be sent to the mobile base station; and transmitting, to the mobile base station, a path switch request acknowledge message to indicate that the bearer path is updated.

Example 20 includes the method of example 18, further comprising: determining a route of a mobile base station; identifying cell handover information for a plurality of serving cells associated with a corresponding plurality of geographical areas based on the route; and transmitting the cell handover information for the plurality of serving cells to the mobile base station.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable storage media having instructions that, when executed, cause processing circuitry to:
   determine cell handover information related to a geographical location;
   determine a first satellite is to be proximate to the geographical location for a period of time;
   cause the first satellite to provide, based on the cell handover information, a serving cell at the geographical location during the period of time; and
   cause the first satellite to transmit synchronization signal and physical broadcast channel blocks (SSBs) in the serving cell before a second satellite ends provision of the serving cell.

2. The one or more non-transitory, computer-readable media of claim 1, wherein to provide the serving cell, the first satellite is to: transmit, based on the cell handover information, system information corresponding to the serving cell.

3. The one or more non-transitory, computer-readable media of claim 1, wherein the instructions, when executed, further cause the processing circuitry to: determine user equipment (UE)-level information corresponding to a UE in a radio resource control (RRC) connected mode within the serving cell.

4. The one or more non-transitory, computer-readable media of claim 3, wherein the instructions, when executed, further cause the processing circuitry to: receive a transfer request from the second satellite over an Xn interface, the transfer request to include the UE-level information.

5. The one or more non-transitory, computer-readable media of claim 1, wherein to provide the serving cell, the first satellite is to: transmit channel state information-reference signals (CSI-RSs).

6. The one or more non-transitory, computer-readable media of claim 1, wherein the instructions, when executed, further cause the processing circuitry to:
   access route information to determine a scheduled route of the first satellite; and
   determine at least a portion of the cell handover information based on the scheduled route.

7. The one or more non-transitory, computer-readable media of claim 6, wherein the instructions, when executed, further cause the processing circuitry to: receive a transfer request from the second satellite, the transfer request to include at least a portion of the cell handover information.

8. The one or more non-transitory, computer-readable media of claim 6, wherein the instructions, when executed, further cause the processing circuitry to: receive, from a base station tracking function in a core network, a message with the route information or at least a portion of the cell handover information.

9. The one or more non-transitory, computer-readable media of claim 1, wherein the first satellite is a mobile base station distributed unit (DU) to provide an air interface for the serving cell.

10. An apparatus comprising:
    processing circuitry to:
      determine cell handover information related to a geographical location;
      determine a first satellite is to be proximate to the geographical location for a period of time;
      cause the first satellite to provide a serving cell for the geographical location during the period of time; and
      cause the first satellite to transmit synchronization signal and physical broadcast channel blocks (SSBs) in the serving cell before a second satellite ends provision of the serving cell; and
    interface circuitry to couple the processing circuitry to a component of the first satellite.

11. The apparatus of claim 10, wherein the cell handover information includes user equipment (UE)-level information for each UE in a connected mode with the serving cell.

12. The apparatus of claim 11, wherein the UE-level information includes a UE context for a first UE.

13. The apparatus of claim 11, wherein the cell handover information includes cell-level information related to a primary cell identity associated with the serving cell and the processing circuitry is further to receive the cell-level information from a base station tracking function in a core network based on a route of the first satellite.

14. The apparatus of claim 10, wherein the serving cell is a first serving cell, the geographical location is a first geographical location, the period of time is a first period of time, and the processing circuitry is to further: provide a second serving cell at a second geographical location using at least one transmit/receive beam, wherein the processing circuitry is to simultaneously provide both the first and second serving cells for a second period of time.

15. The apparatus of claim 10, wherein the first satellite is a low Earth orbit satellite device.

16. A method comprising:
- determining cell handover information related to a geographical location;
- determining a first satellite is to be proximate to the geographical location for a period of time;
- causing the first satellite to provide, based on the cell handover information, a serving cell at the geographical location during the period of time; and
- causing the first satellite to transmit synchronization signal and physical broadcast channel blocks (SSBs) in the serving cell before a second satellite ends provision of the serving cell.

17. The method of claim 16, further comprising:
- accessing route information to determine a scheduled route of the first satellite; and
- determining at least a portion of the cell handover information based on the scheduled route.

18. The method of claim 17, further comprising:
- receiving, from a base station tracking function in a core network, a message with the route information or at least a portion of the cell handover information.

19. The method of claim 16, wherein the first satellite is a mobile base station distributed unit (DU) to provide an air interface for the serving cell.

20. The method of claim 16, further comprising:
- engaging in a random access procedure with a user equipment in the serving cell via the first satellite after transmission of the SSBs.

* * * * *